Patented Aug. 2, 1938

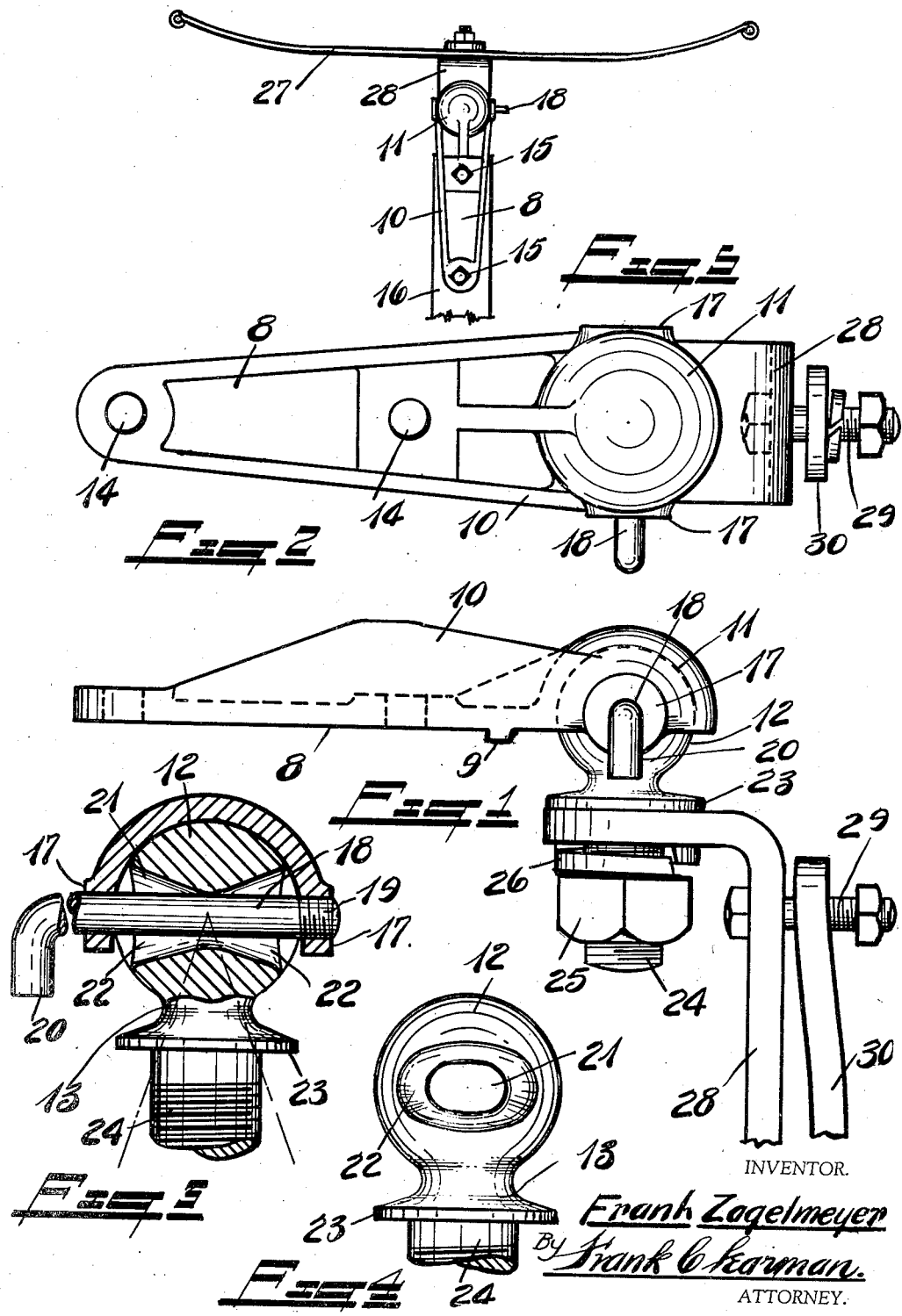

2,125,479

UNITED STATES PATENT OFFICE 2,125,479

COUPLING

Frank Zagelmeyer, Bay City, Mich.

Application October 19, 1935, Serial No. 45,756

2 Claims. (Cl. 280—33.15)

The present invention relates to couplings and more specifically to a coupling used for detachably connecting one vehicle to another.

One of the prime objects of the invention is to design a very simple, practical, and inexpensive coupling, which is very light in weight, which can be easily and quickly attached or detached, and which cannot become accidentally unlocked by severe jolts or jars and cause damage and injury to property and/or persons riding in the vehicle trailer, or in close proximity thereto.

Another object is to provide simple and positive locking means for securing the head of the ball bolt in position in the ball socket, which permits a full universal movement of said head in the socket, and which eliminates back lash, lost motion, chattering or other noises.

A further object is to design a coupling composed of very few parts, all of substantial construction, and which can be readily and economically manufactured and assembled.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion, and minor details of construction, without departing from the spirit, or sacrificing any of the advantages of the invention.

In the drawing—

Fig. 1 is a side elevational view of my coupling, showing a bumper clamping member in connection therewith.

Fig. 2 is a top plan view.

Fig. 3 is an enlarged, fragmentary, transverse, sectional view showing the socket member, ball bolt, and locking pin.

Fig. 4 is an enlarged, fragmentary, side elevational view of the ball bolt.

Fig. 5 is a plan showing the coupling attached to a vehicle bumper.

This coupling employs the conventional ball and socket principle which permits of a universal swiveling action as necessary where two vehicles are connected together in tandem and travel over rough and uneven roadways, the socket member being designated by the numeral 8 and is provided with lugs 9 on the lower face thereof, side walls 10 are provided as shown and terminate in a ball shaped socket section 11 in which the head 12 of a ball bolt 13 is journaled; openings 14 are provided in the body of the socket member 8 in spaced apart relation and accommodate suitable bolts 15 to facilitate securing said socket to the tongue 16 of the trailer or vehicle to be drawn.

Bosses 17 are provided on the sides of the ball shaped section 11, and these bosses are suitably bored to receive a locking pin 18 which is mounted therein, one of said bosses being threaded as shown, and one end of said pin 18 is threaded as at 19 and engages the threaded opening as above described. The opposite end of the pin 18 is bent at right angles to the main body as at 20, and serves as a weight to prevent the accidental unscrewing and release of the pin when the vehicle travels over rough roads or other obstacles, and it also serves as a crank to facilitate the insertion or removal of said pin.

The head 12 of the ball bolt 13 is formed as clearly shown in Figs. 3 and 4 of the drawing, a transversely disposed passage 21 extending through said head, the center being reduced in area, the end sections being flared outwardly as at 22 to permit the ball to freely rock on the pin and to assume positions as indicated in Fig. 3 of the drawing. This range of movement is more than that required in a device of this nature, and it will, of course, be obvious that it can rock in a longitudinal direction in exactly the same manner.

A shoulder 23 is provided on the ball bolts as shown and terminates in a threaded shank 24 on which the nut 25 is threaded, a lock washer 26 being provided as usual to prevent rattle and unscrewing of the nut.

In the present illustration I have shown a clamp for attaching the coupling to a vehicle bumper 27, said clamp comprising a flat bar iron section 28, the upper turned end of which is turned and bored to accommodate the shank 24 of the ball bolt, the vertically disposed section being bored to accommodate a bolt 29 which extends through a companion bar 30 so that the clamp can be readily secured to a bumper.

In attaching the coupling, it is first necessary to attach it to the trailer tongue by means of the bolts 15, the ball bolt 13 is then placed in the socket 11, and the locking pin 18 is then inserted and threaded in the threaded boss 17, the end 20 depending downwardly and preventing the accidental unscrewing of the pin.

The device has a minimum number of parts, it is very light in weight, the ball is positively and universally secured in the socket, and the pin provides a means whereby it can be quickly attached or detached.

From the foregoing description it will be clearly obvious that I have perfected a simple, light, and inexpensive coupling for trailers and the like.

What I claim is:

1. A trailer coupling of the class described and comprising an attaching member adapted to be secured to a trailer tongue, a socket formed integral with and provided in one end of said member, a ball bolt journaled in said socket and formed with a horizontally disposed passage therethrough, a horizontally disposed pin of less diameter than said passage extending therethrough, one end having threaded engagement with the wall of the socket, the opposite end of said pin being turned at right angles to the main body to form a depending section and a weight to prevent accidental rotation of said pin.

2. A trailer coupling of the class described and comprising an attaching member adapted to be attached to a trailer tongue and having a ball shaped socket formed in the one end thereof, transversely disposed openings in the wall of the socket, a ball mounted for universal movement, about a common center in said socket and formed with a transversely disposed passage therethrough, said passage being formed with connecting, outwardly flared cone shaped end sections in alignment with the transversely disposed openings in the wall of the socket, a locking pin mounted in the openings in the wall of the socket and loosely fitting in the passage in the ball, one end of said pin having threaded engagement with one of the openings in the shell, the opposite end being bent downwardly to form a pendant to facilitate manipulation of the pin and also prevent accidental rotation and release thereof.

FRANK ZAGELMEYER.